US012148220B2

(12) United States Patent
Drost et al.

(10) Patent No.: US 12,148,220 B2
(45) Date of Patent: Nov. 19, 2024

(54) METHOD FOR PROVIDING A NEURAL NETWORK FOR DIRECTLY VALIDATING AN ENVIRONMENT MAP IN A VEHICLE BY MEANS OF SENSOR DATA

(71) Applicant: Bayerische Motoren Werke Aktiengesellschaft, Munich (DE)

(72) Inventors: Felix Drost, Puchheim (DE); Sebastian Schneider, Feldkirchen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/766,847

(22) PCT Filed: Sep. 1, 2020

(86) PCT No.: PCT/EP2020/074300
§ 371 (c)(1),
(2) Date: Apr. 6, 2022

(87) PCT Pub. No.: WO2021/069146
PCT Pub. Date: Apr. 15, 2021

(65) Prior Publication Data
US 2024/0062550 A1 Feb. 22, 2024

(30) Foreign Application Priority Data

Oct. 7, 2019 (DE) .................... 10 2019 126 874.5

(51) Int. Cl.
*G06V 20/56* (2022.01)
*G06V 10/82* (2022.01)
(52) U.S. Cl.
CPC ............. *G06V 20/56* (2022.01); *G06V 10/82* (2022.01)

(58) Field of Classification Search
CPC .. G06V 20/56; G06V 10/82; G06F 18/24133; G06N 3/08; G01C 21/3461; G08G 1/096725
See application file for complete search history.

(56) References Cited

U.S. PATENT DOCUMENTS

2018/0189578 A1 7/2018 Yang et al.
2018/0349746 A1* 12/2018 Vallespi-Gonzalez ....................... G01S 7/4808
2019/0325309 A1* 10/2019 Flamant ................ G06N 3/045
(Continued)

FOREIGN PATENT DOCUMENTS

DE 10 2019 113 114 A1 12/2019

OTHER PUBLICATIONS

Kichun J. et al., "Simultaneous Localization and Map Change Update for the High Definition Map-Based Autonomous Driving Car", Sensors, Sep. 18, 2018, pp. 1-16, vol. 18, XP055753166, (16 pages).

(Continued)

*Primary Examiner* — Pinalben Patel
(74) *Attorney, Agent, or Firm* — Crowell & Moring LLP

(57) ABSTRACT

A method is described for providing a neural network for directly validating an environment map in a vehicle by means of sensor data. Valid or legitimate environment data is provided in a feature representation from map data and sensor data. Invalid or illegitimate environment data is provided in a feature representation from map data and sensor data. A neutral network is trained using the valid environment data and the invalid environment data.

9 Claims, 2 Drawing Sheets

(56) References Cited

U.S. PATENT DOCUMENTS

| | | | | |
|---|---|---|---|---|
| 2019/0354860 | A1* | 11/2019 | Karg | G06F 18/231 |
| 2020/0134382 | A1* | 4/2020 | Zhuravlev | G06F 18/217 |
| 2020/0207375 | A1* | 7/2020 | Mehta | B60W 60/00274 |
| 2023/0213643 | A1* | 7/2023 | Hwang | G06T 7/50 |
| | | | | 382/106 |
| 2024/0125899 | A1* | 4/2024 | Khadem | G01S 17/931 |

OTHER PUBLICATIONS

Sharma N. et al., "An Analysis of Convolutional Neural Networks for Image Classification", Procedia Computer Science, 2018, pp. 377-384, 132, (13 pages).

"Rechtsfolgen zunehmender Fahrzeugautomatisierung", Bundesanstalt fuer Strassenwesen (BASt) [German Federal Highway Research Institute], Forschung kompakt [Research News], Edition Nov. 2012 with English Abstract (two (2) pages).

"(R) Taxonomy and Definitions for Terms Related to Driving Automation Systems for On-Road Motor Vehicles", Surface Vehicle Recommended Practice, SAE (Society of Automotive Engineering) International, J3016TM, Sep. 2016, pp. 1-30 (30 pages).

International Search Report (PCT/ISA/210) issued in PCT Application No. PCT/EP2020/074300 dated Dec. 2, 2020 with English translation (five (5) pages).

German-language Written Opinion (PCT/ISA/237) issued in PCT Application No. PCT/EP2020/074300 dated Dec. 2, 2020 (three (3) pages).

German-language Search Report issued in German Application No. 10 2019 126 874.5 dated May 5, 2020 with partial English translation (ten (10) pages).

Bittel S. et al., "Estimating High Definition Map Parameters with Convolutional Neural Networks", 2017 IEEE International Conference on Systems, Man, and Cybernetics (SMC), IEEE, Oct. 5, 2007, pp. 52-56, DOI: 10.1109/SMC.2017.8122577 XP033270906, (five (5) pages).

Liu C. et al., "Deep Multi-Modal Image Correspondence Learning", arxiv.org, Cornell University Library, 201 Olin Library Cornell University Ithaca, NY 14853, Dec. 5, 2016, pp. 1-11, XP080736739, (11 pages).

Zhang Z. et al. "Change Detection between Multimodal Remote Sensing Data Using Siamese CNN", arxiv.org, Cornell University Library, 201 Olin Library Cornell University Ithaca, NY 14853, Jul. 25, 2018, pp. 1-17, XP081253615, (17 pages).

Guo E. et al. "Learning to Measure Changes: Fully Convolutional Siamese Metric Networks for Scene Change Detection", arxiv.org, Cornell University Library, 201 Olin Library Cornell University Ithaca, NY 14853, Oct. 22, 2018, pp. 1-10, XP081428422, (10 pages).

* cited by examiner

METHOD FOR PROVIDING A NEURAL NETWORK FOR DIRECTLY VALIDATING AN ENVIRONMENT MAP IN A VEHICLE BY MEANS OF SENSOR DATA

BACKGROUND AND SUMMARY OF THE INVENTION

Modern vehicles comprise a multiplicity of different sensor systems, for example a LiDAR system, a radar system, a camera, and an ultrasonic system. Such sensor systems can be used for a multiplicity of different applications, for example for driving assistance systems for automated driving. Automated driving may involve driving for a relatively long time, for example on the freeway, or time-limited driving when parking or maneuvering. In addition, automated driving can be carried out in urban areas, that is to say in urban traffic. Such a driving assistance system uses map data and data from the sensor systems to control the vehicle. It is essential here for the surroundings of the vehicle to be determined unambiguously and as accurately as possible.

It is an object of the present disclosure to specify a method and a system for providing a neural network for directly validating an environment map in a vehicle by means of sensor data, a method for directly validating an environment map in a vehicle by means of sensor data, a storage medium for carrying out the methods, and a vehicle having such a storage medium, which make it possible to safely use a predefined environment map. It is an object of the present subject matter to operate a driving assistance system for automated driving in a safe and reliable manner.

This object is achieved by means of the subject matter of the independent claims. Advantageous configurations are specified in the subclaims.

An independent aspect of the present disclosure specifies a method for providing a neural network for directly validating an environment map in a vehicle by means of sensor data. The method comprises providing valid surroundings data in a feature representation comprising map data and sensor data; providing invalid surroundings data in a feature representation comprising map data and sensor data; and training a neural network with the valid surroundings data and the invalid surroundings data, for example by means of a representation of the valid surroundings data and invalid surroundings data in a joint representation. This may be carried out by means of deep learning and, in particular, representation learning.

Within the scope of the present disclosure, the term "feature representation" means that inputs from various sources, such as HD map data and sensor data, are represented in a low-dimensional feature space such as a joint latent space.

The map data are predefined map data and, in particular, HD map data which indicate a digital map which is generally stored in vehicles and is used, for example, to operate a driving assistance system for automated driving. In some embodiments, the digital map may be downloaded and/or updated online, for example.

The sensor data are, for example, image data from a camera. The sensor data may be recorded by means of a measurement vehicle in order to train the neural network.

According to the present subject matter, deep learning is used to train a neural network which can be used to directly validate a predefined environment map during ongoing operation of a vehicle without an environment model first of all having to be created from sensor data, for example. In order to generate the training data, map information and various sensor modalities of the vehicle can be recorded, for example, during the test drives. These can then be converted into an image representation. Data pairs with the same recording time can be indicated as valid surroundings data. Invalid surroundings data may be generated by comparing map and sensor images with different time stamps. The neural network trained in this manner can validate a predefined environment map during ongoing operation of a vehicle directly and in a reliable manner.

The provision of valid surroundings data and invalid surroundings data preferably comprises generating the respective feature representation using a first convolutional neural network (CNN) and a second convolutional neural network, wherein the first convolutional neural network uses the map data as input and the second convolutional neural network uses the sensor data as input. The map data (that is to say data corresponding to the environment map) and the sensor data (for example image data from a camera) can therefore be converted into a joint latent space, with the result that a comparison is possible.

The valid surroundings data and the invalid surroundings data are preferably based on image data, for example from at least one camera, for example of a measurement vehicle. However, the present disclosure is not restricted to camera data and it is possible to use other types of sensors which allow an image representation.

A validity of the map data in the feature representation is preferably also determined, for example using a Siamese neural network. In this case, Siamese networks describe a structure comprising the two CNNs of identical architecture (normally with shared weights, but not in some embodiments of the present disclosure), optionally with fully connected layers and the subsequent comparison using a distance metric.

In some embodiments, the validity can be determined as a binary decision. In particular, the valid surroundings data correspond to a match between measurement data relating to the surroundings and predefined map data, and the invalid surroundings data correspond to the lack of a match between the measurement data relating to the surroundings and the predefined map data. The pairs of map data and sensor data in the feature representation can be labeled accordingly.

During representation learning by means of the CNN, the input from various sources is converted into a joint latent space. For images in the same domain, this can be carried out by using a Siamese architecture. Since the representation of map data and sensor data differs greatly, this architecture cannot be used for map validation. In this case, the architecture may still be Siamese insofar as the architecture of both CNNs is still identical, but weight sharing is dispensed with. In order to compare the on-board sensor measurements with the map data, convolutional neural networks are used according to embodiments of the present disclosure in order to obtain the feature representation of the map data and sensor data.

The binary decision relating to the validity of the map is based on the comparison of map data and sensor data in this compressed representation. The two convolutional neural networks (CNN) of the same architecture use map and sensor data as input. These CNNs do not share their weights. This increases the number of trainable parameters by a factor of two, but results in each CNN be able to learn its own transformation function in the joint latent space instead of both being dependent on finding common features in both modalities. Each convolutional network therefore individually processes an input source (for example map or sensor data).

The binary classification is carried out on the basis of this feature representation of map and sensor data. One possible way of doing this is to use the Euclidean distance in the latent space: if it is above a threshold, the pair is considered to be invalid. Another possibility is to use fully connected layers which have been trained for the binary classification. The feature extractor and the classification network are consistently trained at the same time.

Since there is a difference between training and use in the autonomous vehicle, the threshold obtained from the training set does not always lead to accurate results. Therefore, a series of real invalid pairs can be used to determine a situation-specific threshold value.

The valid surroundings data preferably correspond to map data and sensor data from the same time, and the invalid surroundings data correspond to map data and sensor data from different times. In particular, the limited number of invalid samples for training a deep learning model for map validation is a challenge. Training and test data may have a different structure. In the training data, map and sensor images with different time stamps may be used to generate the invalid surroundings data.

The surroundings data preferably relate to at least one of the following aspects: a structural property, in particular a structural property of a street or road and/or a road layout and/or moving objects and/or still objects, in particular other road users and/or traffic signs, in particular signs and/or illuminated signs.

A further aspect of the present disclosure specifies a method for directly validating an environment map in a vehicle by means of sensor data. The method comprises providing sensor data by means of at least one sensor arrangement; and validating the predefined environment map on the basis of the sensor data and using the neural network trained using the method described above.

According to the present subject matter, sensor data captured by sensors of the vehicle are used to check a validity or correctness of a predefined environment map. If the sensor data captured by the sensors match the predefined environment map, a positive validation of the predefined environment map can be carried out. However, if the sensor data captured by the sensors do not match the predefined environment map, no positive validation (that is to say a negative validation) of the predefined environment map can be carried out. This makes it possible to ensure that the predefined environment map corresponds to the actual surroundings of the vehicle. In particular, a driving assistance system for automated driving can be operated in a safe and reliable manner using the validated predefined environment map.

Within the scope of the present disclosure, the term "predefined environment map" relates to a digital map which is stored in the vehicle and is used, for example, to operate a driving assistance system for automated driving. In other words, the predefined environment map is not a map which is created using the sensor data captured by the sensors of the vehicle.

The vehicle comprises at least one sensor arrangement (also referred to as "environment sensor system") which is configured to capture the surroundings data. The at least one sensor arrangement preferably comprises at least one LiDAR system and/or at least one radar system and/or at least one camera and/or at least one ultrasonic system. The at least one sensor arrangement can provide the sensor data (also referred to as "environment data" or "surroundings data") which represent an environmental region of the vehicle.

The validation of the predefined environment map preferably comprises a binary classification of the validity of the predefined environment map.

The validation of the predefined environment map preferably comprises determining a probability of the predefined environment map being correct.

The validation of the predefined environment map preferably comprises determining that the predefined environment map is valid if the probability is greater than or equal to a predetermined threshold value; and determining that the predefined environment map is not valid if the probability is less than or equal to the predetermined threshold value. The predetermined threshold value can be selected such that it is possible to safely control an automated driving function, for example.

A further aspect of the present disclosure provides a storage medium having a software program. The software program is configured to be executed on one or more processors and to thereby carry out the methods described in this document.

A further aspect of the present disclosure specifies a system for providing a neural network for directly validating an environment map in a vehicle by means of sensor data. The system comprises a processor module which is configured to train a neural network with valid surroundings data and invalid surroundings data, wherein the valid surroundings data and the invalid surroundings data are each represented in a feature representation comprising map data and sensor data.

The system for providing a neural network for directly validating an environment map in a vehicle by means of sensor data, that is to say the training, is preferably implemented in a central unit, for example belonging to a vehicle manufacturer.

The system may contain aspects which are described in connection with the method for providing a neural network for directly validating an environment map in a vehicle by means of sensor data of the present disclosure. Similarly, the method may implement the aspects described in connection with the system.

The system is preferably included in a driving assistance system for automated driving.

A further independent aspect specifies a vehicle, in particular a motor vehicle. The vehicle comprises a storage medium having a software program which is configured to be executed on one or more processors and to thereby carry out the method for directly validating an environment map in a vehicle by means of sensor data.

The term "vehicle" comprises an automobile, a truck, buses, motorhomes, motorcycles, etc., which are used to transport persons, goods, etc. In particular, the term comprises motor vehicles for transporting persons.

The vehicle preferably comprises a driving assistance system for automated driving. The driving assistance system for automated driving may use the predefined environment map to control the vehicle.

Within the scope of the document, the term "automated driving" may be understood as meaning driving with automated longitudinal or lateral guidance or autonomous driving with automated longitudinal and lateral guidance. Automated driving may involve, for example, driving on the freeway for a relatively long time or time-limited driving when parking or maneuvering, in particular in urban traffic. The term "automated driving" comprises automated driving with any desired degree of automation. Example degrees of automation are assisted, partially automated, highly automated or fully automated driving. These degrees of automation were defined by the Federal Highway Research Institute (BASt) (see BASt publication "Forschung kompakt", issued November 2012).

During assisted driving, the driver permanently carries out the longitudinal or lateral guidance, while the system performs the respective other function within certain limits. During partially automated driving, the system performs the longitudinal and lateral guidance for a certain period and/or in specific situations, in which case the driver must permanently monitor the system, as during assisted driving. In highly automated driving, the system performs the longitudinal and lateral guidance for a certain period without the driver having to permanently monitor the system; however, the driver must be able to take over the vehicle guidance in a certain time. During fully automated driving, the system can automatically manage the driving in all situations for a specific application; a driver is no longer required for this application.

The four degrees of automation mentioned above correspond to SAE levels 1 to 4 of the SAE J3016 standard (SAE-Society of Automotive Engineering). For example, highly automated driving corresponds to level 3 of the SAE J3016 standard. Furthermore, in SAE J3016, SAE level 5 is also provided as the highest degree of automation which is not included in the definition by the BASt. SAE level 5 corresponds to driverless driving in which the system can automatically manage all situations like a human driver during the entire journey; a driver is generally no longer required.

DETAILED DESCRIPTION OF THE DRAWINGS

Identical reference signs are used for identical and identically acting elements below, unless noted otherwise.

Figure 1:
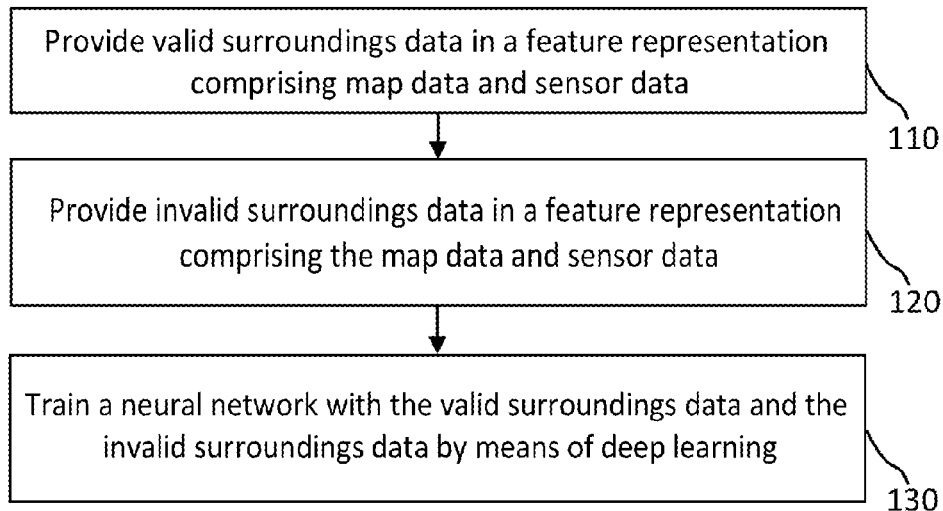
FIG. 1 schematically shows a flowchart of a method for providing a neural network for directly validating an environment map in a vehicle by means of sensor data according to the present disclosure, FIG. 2 schematically shows a flowchart of a method for directly validating an environment map in a vehicle by means of sensor data according to the present disclosure, and FIG. 3 schematically shows a vehicle having a driving assistance system for automated driving according to the present disclosure.

FIG. 1 schematically shows a flowchart of a method 100 for providing a neural network for directly validating an environment map in a vehicle by means of sensor data according to embodiments of the present disclosure.

The method 100 comprises, in block 110, providing valid surroundings data in a feature representation comprising map data and sensor data; in block 120, providing invalid surroundings data in a feature representation comprising map data and sensor data; and, in block 130, training a neural network with the valid surroundings data and the invalid surroundings data, for example by means of deep learning and, in particular, representation learning.

The valid surroundings data and the invalid surroundings data, such as the map data and/or sensor data, are typically based on image data. The image data may come from at least one camera, for example of a measurement vehicle, but are not limited thereto. The important factor is only that the training and the use of the vehicle operate on the same modality.

In some embodiments, the provision of valid surroundings data and invalid surroundings data comprises generating the respective feature representation using a first convolutional neural network (CNN) and a second convolutional neural network, wherein the first convolutional neural network uses the map data as input and the second convolutional neural network uses the sensor data as input. A validity of the map data in the feature representation is typically also determined, for example using a Siamese neural network. In this case, the Siamese neural network comprises the two CNNs and the decision.

In some embodiments, the validity can be determined as a binary decision. In particular, the binary decision relating to the validity of the map is carried out on the basis of the comparison of map and sensor data in this compressed representation. One possible way of doing this is to use the Euclidean distance in the latent space: if it is above a threshold, the pair is considered to be invalid. Another possibility is to use fully connected layers which have been trained for the binary classification.

In some embodiments, the valid surroundings data correspond to map data and sensor data from the same time, and the invalid surroundings data correspond to map data and sensor data from different times. In particular, the limited number of invalid samples for training a deep learning model for map validation is a challenge. Training and test data may have a different structure. In the training data, map and sensor images with different time stamps can be used to generate the invalid surroundings data.

A further aspect of the present disclosure specifies a system for providing a neural network for directly validating an environment map in a vehicle by means of sensor data. The system comprises a processor module which is configured to train a neural network with valid surroundings data and invalid surroundings data by means of deep learning.

The system is preferably implemented in a central unit, for example belonging to a vehicle manufacturer.

The neural network trained in the manner described above can validate a predefined environment map during ongoing operation of a vehicle directly and in a reliable manner, as described below with reference to FIG. 2.

Figure 2:
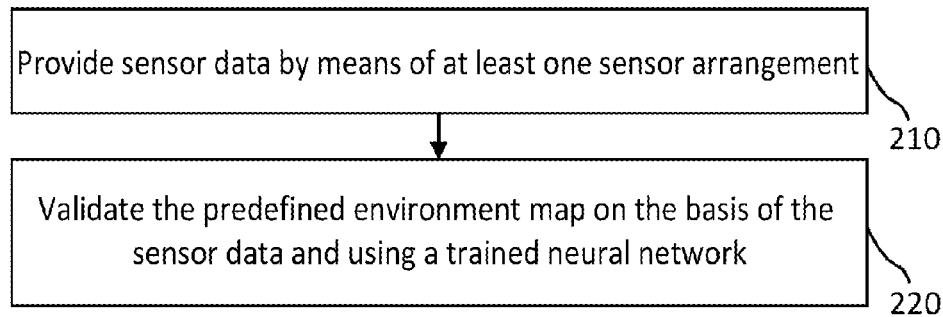

FIG. 2 schematically shows a flowchart of a method 200 for directly validating an environment map in a vehicle by means of sensor data according to embodiments of the present disclosure.

The method 200 comprises, in block 210, providing sensor data by means of at least one sensor arrangement; and, in block 220, validating the predefined environment map on the basis of the sensor data and using the neural network trained using the method described above.

Sensor data captured by sensors of the vehicle can be used here to check a validity or correctness of a predefined environment map. If the sensor data captured by the sensors match the predefined environment map, a positive validation of the predefined environment map can be carried out. However, if the sensor data captured by the sensors do not match the predefined environment map, no positive validation (that is to say a negative validation) of the predefined environment map can be carried out. This makes it possible to ensure that the predefined environment map corresponds to the actual surroundings of the vehicle. In particular, a driving assistance system for automated driving can be operated in a safe and reliable manner using the validated predefined environment map.

The vehicle comprises at least one sensor arrangement (also referred to as "environment sensor system") which is configured to capture the sensor data. The at least one sensor arrangement preferably comprises at least one LiDAR system and/or at least one radar system and/or at least one camera and/or at least one ultrasonic system. The at least one sensor arrangement can provide the sensor data (also referred to as "environment data" or "surroundings data") which represent an environmental region of the vehicle.

In some embodiments, the validation of the predefined environment map comprises a binary classification of the validity of the predefined environment map.

In further embodiments, the validation of the predefined environment map comprises determining a probability of the predefined environment map being correct.

For example, the validation of the predefined environment map comprises determining that the predefined environment map is valid if the probability is greater than or equal to a predetermined threshold value; and determining that the predefined environment map is invalid if the probability is less than or equal to the predetermined threshold value. The predetermined threshold value can be selected such that it is possible to safely control an automated driving function, for example.

Figure 3:
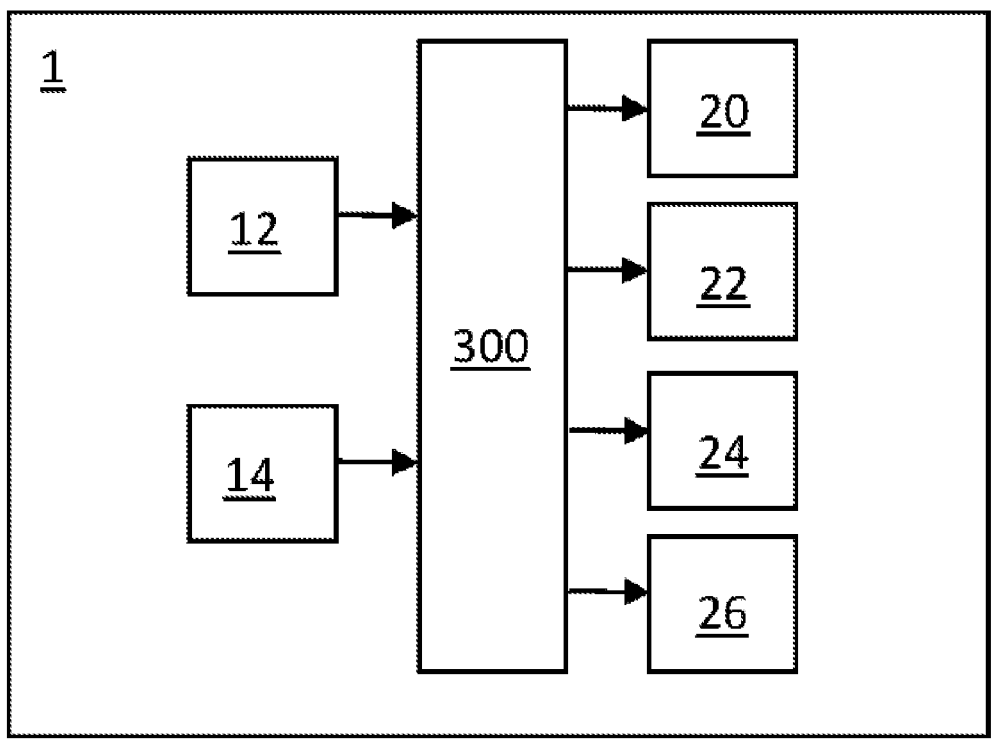

FIG. 3 schematically shows a vehicle 1 having a driving assistance system 300 for automated driving according to embodiments of the present disclosure.

In particular, a vehicle 1 comprises the driving assistance system 300 for automated driving. During automated driving, the longitudinal and lateral guidance of the vehicle 1 is carried out automatically. The driving assistance system 300 therefore performs the vehicle guidance. For this purpose, the driving assistance system 300 controls the drive 20, the transmission 22, the hydraulic service brake 24 and the steering system 26 using intermediate units, which are not illustrated.

The vehicle comprises at least one sensor arrangement 12 (also referred to as "environment sensor system") which is configured to capture the sensor data. The at least one sensor arrangement 12 preferably comprises at least one LiDAR system and/or at least one radar system and/or at least one camera and/or at least one ultrasonic system.

In order to plan and carry out automated driving, surroundings information from the at least one sensor arrangement 12, which monitors the vehicle surroundings, is received by the driver assistance system 300.

The vehicle 1 additionally comprises a storage medium 14 having a software program which is configured to be executed on one or more processors and to thereby carry out the method for directly validating an environment map by means of sensor data according to FIG. 2.

According to the present subject matter, deep learning is used to train a neural network which can be used to directly validate a predefined environment map during ongoing operation of a vehicle without an environment model first of all having to be created from sensor data, for example. In order to generate the training data, map information and various sensor modalities of the vehicle can be recorded during the test drives, for example. These can then be converted into an image representation. Data pairs with the same recording time can be indicated as valid surroundings data. Invalid surroundings data can be generated by comparing map and sensor images with different time stamps. The neural network trained in this manner can validate a predefined environment map during ongoing operation of a vehicle directly and in a reliable manner.

What is claimed is:

1. A method for providing a neural network for directly validating an environment map in a vehicle using sensor data, comprising:
    providing valid surroundings data in a feature representation comprising map data and the sensor data, wherein the map data comprises the environment map;
    providing invalid surroundings data in a feature representation comprising the map data and the sensor data; and
    training a neural network with the valid surroundings data and the invalid surroundings data;
    wherein the providing of the valid surroundings data and the invalid surroundings data is carried out using a Siamese neural network and comprises:
        generating the feature representation using a first convolutional neural network and a second convolutional neural network, wherein:
            the first convolutional neural network uses the map data comprising the environment map as input, and the second convolutional neural network uses the sensor data as input; and
        determining a validity of the map data in the feature representation.

2. The method according to claim 1, wherein
    the valid surroundings data correspond to a match between the map data and sensor data, and
    the invalid surroundings data correspond to a lack of a match between the map data and the sensor data.

3. The method according to claim 2, wherein
    the valid surroundings data correspond to map data and sensor data from a same time, and
    the invalid surroundings data correspond to map data and sensor data from different times.

4. The method according to claim 2, wherein
    the valid surroundings data and the invalid surroundings data are based on image data.

5. A method for directly validating a predefined environment map in a vehicle using sensor data, comprising:
    providing the sensor data using at least one sensor arrangement; and
    validating the predefined environment map based on the sensor data and using the neural network trained using the method according to claim 1.

6. The method according to claim 5, wherein
    the validation of the predefined environment map comprises a binary classification of the validity of the predefined environment map.

7. A non-transitory computer-readable medium comprising instructions operable, when executed by one or more computing systems, to perform the method of claim 5.

8. A system for providing a neural network for directly validating an environment map in a vehicle using sensor data, comprising:
    a processor configured to train a neural network with valid surroundings data and invalid surroundings data, wherein:
        the valid surroundings data and the invalid surroundings data are each represented in a feature representation comprising map data and sensor data; and
        the processor is configured to receive the valid surroundings data and the invalid surroundings data from a Siamese neural network that generates the feature representation using a first convolutional neural network and a second convolutional neural network, wherein the first convolutional neural network uses map data comprising the environmental map as input, and the second convolutional neural network uses the sensor data as input and determines a validity of the map data in the feature representation.

9. A motor vehicle, comprising a non-transitory storage medium having a software program which is configured to be executed on one or more processors and to thereby carry out the method according to claim 8.

* * * * *